United States Patent
Jeon

(10) Patent No.: US 10,341,337 B2
(45) Date of Patent: *Jul. 2, 2019

(54) SYSTEM AND METHOD FOR ISSUING OTP APPLICATION IN FACE-TO-FACE CONFIRMATION MANNER

(71) Applicant: SK PLANET CO., LTD., Seongnam-si Gyeonggi-do (KR)

(72) Inventor: Jae Sic Jeon, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,717

(22) Filed: Mar. 8, 2018

(65) Prior Publication Data

US 2018/0198780 A1 Jul. 12, 2018

Related U.S. Application Data

(63) Continuation of application No. 14/955,837, filed on Dec. 1, 2015, now Pat. No. 9,948,639.

(30) Foreign Application Priority Data

May 19, 2015 (KR) .......................... 10-2015-0069617

(51) Int. Cl.
*H04L 29/06* (2006.01)

(52) U.S. Cl.
CPC ...... *H04L 63/0838* (2013.01); *H04L 63/0853* (2013.01)

(58) Field of Classification Search
CPC ........ H04L 63/12; H04L 63/083; G06F 21/60
See application file for complete search history.

(56) References Cited

U.S. PATENT DOCUMENTS 9,038,157 B1 * 5/2015 Santiago, Jr. ........... G06F 21/34
726/9

FOREIGN PATENT DOCUMENTS

KR 101479318 B1 11/2013

* cited by examiner

*Primary Examiner* — Izunna Okeke
(74) *Attorney, Agent, or Firm* — Brinks Gilson & Lione

(57) ABSTRACT

The present invention relates to a system and method for issuing an OTP application in a face-to-face confirmation manner, and the system includes at least one or more service provider devices for transmitting OTP application issuance request information, including information on recognition of a terminal device tagged on a reader provided for each service provider or entering a previously set service area, to an integrated service device; and the integrated service device for registering secure storage medium identification information as medium identification information for OTP authentication and transmitting an OTP installation guide to the terminal device if the recognition information is the secure storage medium identification information, and transmitting the OTP installation guide to the terminal device if the recognition information is terminal device identification information, in which the terminal device can be a terminal device of a user seeing a service provider face-to-face.

18 Claims, 9 Drawing Sheets

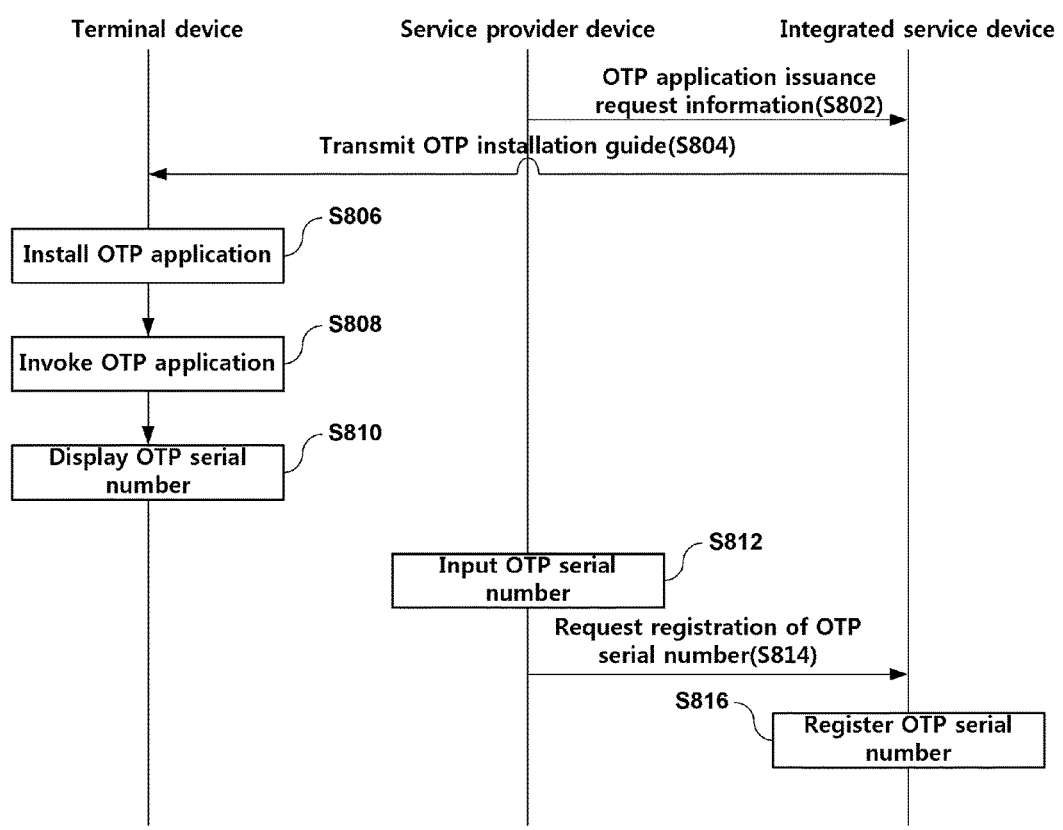

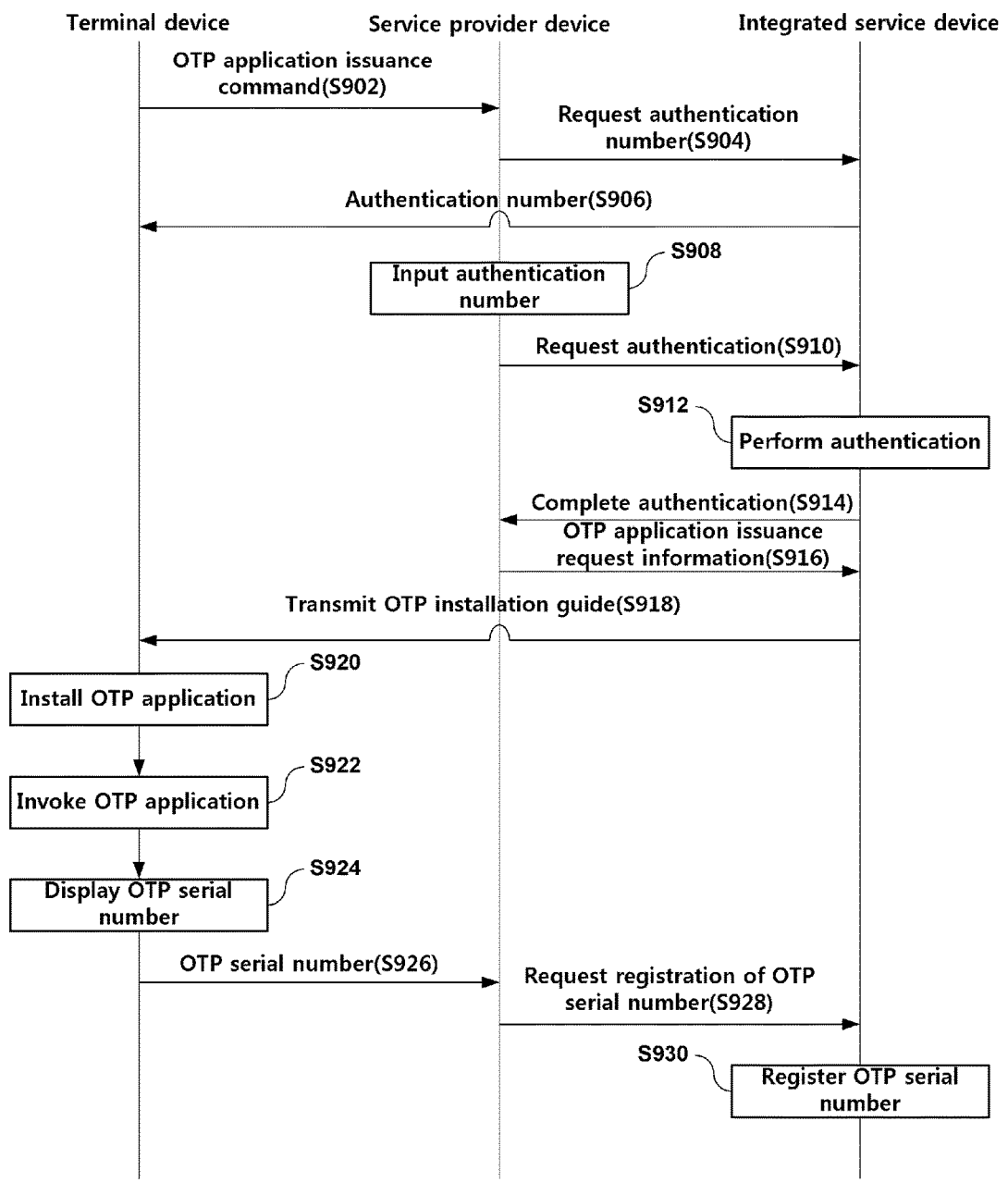

SYSTEM AND METHOD FOR ISSUING OTP APPLICATION IN FACE-TO-FACE CONFIRMATION MANNER

CROSS REFERENCE TO RELATED APPLICATION

The present application is a continuation application of U.S. patent application Ser. No. 14/955,837, filed Dec. 1, 2015, which claims the benefit of Korean Patent Application No. 10-2015-0069617 filed in the Korean Intellectual Property Office on May 19, 2015, the entire contents of which are incorporated herein by reference.

BACKGROUND OF THE INVENTION

Field of the Invention

The present invention relates to a system and method for issuing an OTP application in a face-to-face confirmation manner, and more specifically, to a system and method for issuing an OTP application in a face-to-face confirmation manner, which can solve the problem of face-to-face confirmation for confirming a real name of a user by registering secure storage medium identification information or an OTP serial number acquired from a reader to install an OTP application in a secure storage medium of a terminal device.

Background of the Related Art

A one time password (hereinafter, referred to as an OTP) generator used in a bank, stock or insurance transaction is provided through a separate device. When a financial institute provides an OTP generator to a customer, it performs a procedure of registering a serial number printed on the back of the OTP generator in corresponding subscriber information after confirming the real name of the user.

When a customer performs transfer of money larger than a specific amount in a banking transaction, the customer inputs an OTP generated by an OTP generator as an additional authentication means, and the bank performs a procedure of verifying the OTP.

However, such a method has a problem of inconvenience in using the OTP generator since the user should possess an OTP generator for each service provider and a problem of increasing the inconvenience in using the OTP generator since the user should separately carry the OTP generator.

In order to solve such problems, a card (IC card) type OTP generator connectible to a terminal device always carried by a user is distributed. Such a card is provided with an OTP function in addition to the function of a cash card or a check card generally distributed by a bank, and compared with an OTP generator of dedicated hardware, the card type OTP generator can be distributed at a much lower price since it does not need to mount a display or a battery, and it is very convenient since the customer may carry the card type OTP generator in a wallet.

Such a method may provide a function the same as that of the dedicated hardware method since an OTP application for generating an OTP is provided in the card and a generated OTP can be displayed on the terminal device, and this method also performs a work of confirming the real name of the user and matching an OTP serial number when a bank branch issues the card to the user.

However, since an OTP authentication method using a terminal device should contact the card to the back of the terminal device to generate and input an OTP when the user performs a financial transaction, the work should be done with two hands, or even a risk of breaking the terminal device may occur since handling the terminal device is inconvenient.

In order to solve such problems, there is an attempt of mounting an OTP application in a secure area of a terminal device, such as a Universal Subscriber Identity Module (USIM), a Secure Element (SE), a TrustZone or the like, and using the OTP application in a financial transaction service.

However, since a face-to-face confirmation should be performed as a method of confirming the real name of the user, the OTP application cannot be used for the purpose of financial transactions to which a strict regulation is applied.

SUMMARY OF THE INVENTION

Therefore, the present invention has been made in view of the above problems, and it is an object of the present invention to provide a system and method for issuing an OTP application in a face-to-face confirmation manner, which can solve the problem of face-to-face confirmation for confirming a real name of a user, which occurs when an OTP application is installed in a secure area of a terminal device (e.g., a USIM, an SE, a TrustZone or the like).

Another object of the present invention is to provide a system and method for issuing an OTP application in a face-to-face confirmation manner, which can reduce a waiting time required to see a service provider face-to-face at a branch of a bank or the like to install the OTP application in a terminal device.

Still another object of the present invention is to provide a system and method for issuing an OTP application in a face-to-face confirmation manner, which can install the OTP application in a terminal device at any time as needed if face-to-face confirmation with a service provider is finished.

Meanwhile, the technical problems to be solved in the present invention are not limited to those mentioned above, and a variety of technical problems may be included from the following descriptions within the scope apparent to those skilled in the art.

To accomplish the above objects, according to one aspect of the present invention, there is provided a system for issuing an OTP application in a face-to-face confirmation manner, the system including at least one or more service provider devices for transmitting OTP application issuance request information, including information on recognition of a terminal device tagged on a reader provided for each service provider or entering a previously set service area, to an integrated service device; and the integrated service device for registering secure storage medium identification information as medium identification information for OTP authentication and transmitting an OTP installation guide to the terminal device if the recognition information is the secure storage medium identification information, and transmitting the OTP installation guide to the terminal device if the recognition information is terminal device identification information, in which the terminal device is a terminal device of a user seeing a service provider face-to-face.

The terminal device receiving the OTP installation guide may determine whether or not the OTP application exists, display a message inquiring whether or not to install the OTP application if the OTP application does not exist, and install the OTP application according to selection of a user.

The service provider device may transmit an OTP serial number received from the service provider to the integrated service device, and the integrated service device may receive and register the OTP serial number as medium identification information for OTP authentication.

According to another aspect of the present invention, there is provided a service provider device including a communication unit for transmitting and receiving data to and from an integrated service device; a device recognition unit provided for each service provider to recognize a terminal device; and an OTP installation intermediation unit for transmitting OTP application issuance request information including secure storage medium identification information to the integrated service device when the secure storage medium identification information is recognized through the device recognition unit, and requesting transmission of an OTP installation guide to the terminal device when terminal device identification information is recognized through the device recognition unit.

The service provider device may further include an authentication request unit for requesting an authentication number for the terminal device from the integrated service device and transmitting, if the authentication number is input, the input authentication number to the integrated service device to perform authentication.

The device recognition unit may be a reader for recognizing secure medium identification information by tagging of the terminal device or a module for receiving identification information of a terminal device entering a previously set service area from the service provider.

When an OTP serial number is received or inputted from the terminal device or the service provider, the OTP installation intermediation unit may register the OTP serial number as medium identification information for OTP authentication.

According to still another aspect of the present invention, there is provided an integrated service device including a communication unit for transmitting and receiving data to and from a terminal device or a service provider device; and a registration processing unit for registering, if OTP application issuance request information including secure storage medium identification information of the terminal device is received from the service provider device, the secure storage medium identification information as medium identification information for OTP authentication and transmitting an OTP installation guide to the terminal device.

The registration processing unit may confirm whether or not an OTP of a corresponding terminal device has been issued if OTP application issuance request information including terminal device identification information or service area identification information is received from the service provider device, transmit an OTP installation guide to the terminal device if the OTP has not been issued, and register an OTP serial number as medium identification information for OTP authentication if the OTP serial number is received from the service provider device.

The integrated service device may further include an authentication unit for generating and transmitting an authentication number to the terminal device if an authentication number request signal is received from the service provider device and, if an authentication request signal including the authentication number is received from the service provider device, comparing the authentication number with a previously stored authentication number and transmitting a result of authentication to the service provider device.

In addition, the integrated service device may further include an OTP service unit for providing an OTP application when download of the OTP application is requested by the terminal device.

Meanwhile, the 'system and method for issuing an OTP application in a face-to-face confirmation manner' may be recorded in a recording medium that can be read by an electronic device or distributed through a program download management device (a server or the like), after being implemented in the form of a program.

According to the present invention, the problem of face-to-face confirmation for confirming a real name of a user, which occurs when an OTP application is installed in a secure area of a terminal device (e.g., a USIM, an SE, a TrustZone or the like), can be solved.

In addition, the present invention has an effect of safely and conveniently utilizing authentication when a bank or stock transaction is performed and preventing financial fraud which occurs in non-face-to-face authentication, by mounting an OTP application in a secure medium (a USIM, an SE, a TrustZone or the like) of a terminal device carried by a user every day.

In addition, OTP distribution cost can be reduced from the viewpoint of a financial company, and a secure medium providing company such as a communication company or the like may utilize the present invention to prevent decrease of subscribers by providing a service convenient for customers.

In addition, since a customer only needs to tag a terminal device on a reader or present an OTP serial number while seeing a service provider face-to-face to install an OTP application in the terminal device, a waiting time required to see the service provider at a branch of a bank or the like to install the OTP application can be reduced.

In addition, if the face-to-face confirmation with the service provider is finished, the OTP application can be installed in the terminal device at any time as needed according to the information on the OTP installation guide.

Meanwhile, the effects of the present invention are not limited to those mentioned above, and various effects can be included from the contents which will be described below within the scope apparent to those skilled in the art.

BRIEF DESCRIPTION OF THE DRAWINGS

FIG. 8 is a sequence diagram showing a face-to-face confirmation method for issuing an OTP application in a face-to-face confirmation manner according to another embodiment of the present invention.

FIG. 9 is a sequence diagram showing a method of issuing an OTP application in a face-to-face confirmation manner according to another embodiment of the present invention.

DESCRIPTION OF SYMBOLS

Figure 1:
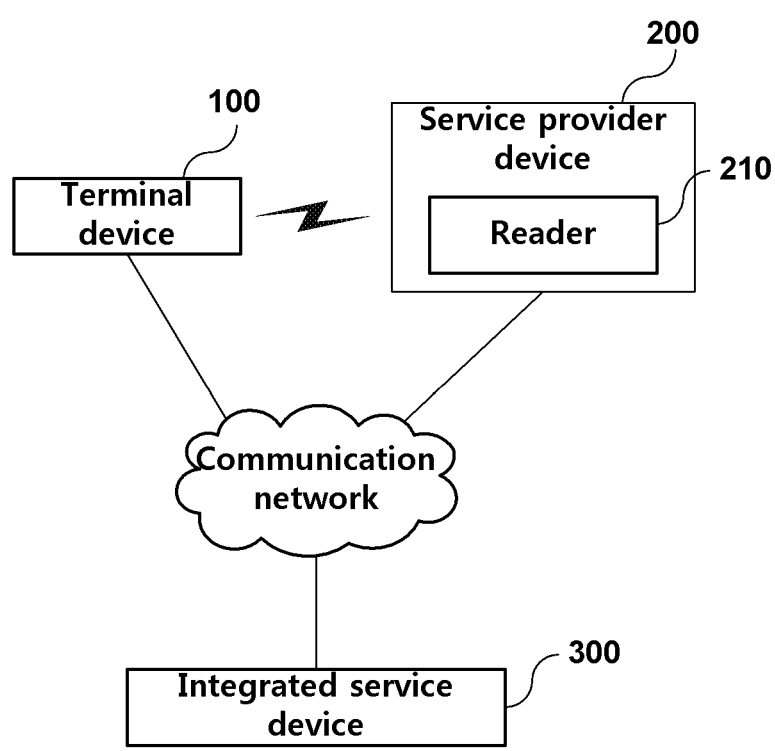
FIG. 1 is a view showing a system for issuing an OTP application in a face-to-face confirmation manner according to an embodiment of the present invention.

| | |
|---|---|
| 100: Terminal device | 110, 230, 320: Communication unit |
| 120, 250: Input unit | 130, 260: Display unit |
| 140: Storage unit | 150: Near field communication unit |
| 160: OTP installation unit | 170, 270, 360: Control unit |
| 200: Service provider device | 210: Device recognition unit |
| 220: OTP installation intermediation unit | |
| 240: Authentication request unit | |
| 300: Integrated service device | 310: Database |
| 330: Authentication unit | 340: Registration processing unit |
| 350: OTP service unit | |

DETAILED DESCRIPTION OF THE PREFERRED EMBODIMENT

Hereinafter, 'a system and method for issuing an OTP application in a face-to-face confirmation manner' according to the present invention will be described in detail with reference to accompanying drawings. The disclosed embodiments are provided to enable those skilled in the art to easily understand the scope of the present invention, and the present invention is not limited by such embodiments. Moreover, matters illustrated in the drawings are schematized in order to describe or explain the embodiments of the present invention more easily, and hence, may be different from forms embodied actually.

Meanwhile, the constitutional components expressed below are merely examples for implementing the present invention. Accordingly, other components may be used in other implementations of the present invention without departing from the spirit and scope of the present invention.

In addition, although each component can be implemented only in a pure hardware or software configuration, it also can be implemented by combining various hardware or software configurations performing the same function. In addition, two or more components may be implemented together by one piece of hardware or software.

In addition, the expression of 'including' an element is an expression of an 'open type' which merely refers to existence of a corresponding component, and it should not be construed as precluding additional components.

Currently, under the regulation of real name confirmation for preventing financial fraud, it is regulated to provide an OTP generator after face-to-face confirmation through a bank window or the like, and the present invention defines a system and method for providing an OTP application by utilizing a secure storage medium such as a USIM, an SE or a TrustZone of a terminal device.

Currently, a procedure of 'real name confirmation' is required for a financial transaction, and, to this end, a 'ace-to-face confirmation' which requests a customer to visit a branch and confirm his or her real name using an identification card is conducted by authoritative interpretation. Under the current law, 'user identification' is confirming whether or not a user is allowed to exercise his or her right, and 'real name confirmation' is confirming identity of the user, not confirming whether or not the user has a right.

FIG. 1 is a view showing a system for issuing an OTP application in a face-to-face confirmation manner according to an embodiment of the present invention.

Referring to FIG. 1, a system for issuing an OTP application in a face-to-face confirmation manner includes a terminal device 100, a service provider device 200 and an integrated service device 300, and these may transmit and receive data through a communication network.

When the terminal device 100 is tagged on a reader 210 provided in a financial institute such as a bank or the like to issue an OTP application, it provides the service provider device 200 with secure storage medium identification information.

The reader 210 is provided for each service provider, and a user of the terminal device may tag the terminal device 100 on the reader 210 while seeing a service provider face-to-face, and thus the problem of face-to-face confirmation for issuing an OTP application can be solved. If such a face-to-face confirmation process is finished, the user may install the OTP application without seeing the service provider face-to-face. The secure storage medium may include a Universal Subscriber Identify Module (USIM), a Secure Element, a TrustZone and the like.

When an OTP installation guide is received from the integrated service device 300, the terminal device 100 determines whether or not the OTP application exists, displays a message inquiring whether or not to install the OTP application if the OTP application does not exist, and installs the OTP application according to selection of the user. At this point, since the user of the terminal device only needs to install the OTP application following the OTP installation guide, the user does not need to see the service provider face-to-face.

The OTP application can be created in the form of an application program (App), stored in a secure storage medium of the terminal device 100, and executed under the control of a processor of the terminal device 100, or can be downloaded from the integrated service device 300 or a separate OTP service server (not shown) and installed in the terminal device 100.

In addition, the OTP application can be expressed as an OTP generation program, an OTP generator or the like, and the OTP application for generating an OTP using one or more fixed seed values confirmed through an OTP generation key value and one or more dynamic seed values dynamically determined/generated as seeds can be implemented in the form of a program code. In addition, a plurality of OTP applications may exist according to the type and modification method thereof.

After the OTP application is installed in the terminal device 100, if the user orders generation of an OTP by handling the terminal device 100, a processor embedded in the terminal device 100 operates to execute the OTP application stored in the secure storage medium and generates an OTP using an OTP secret key and current time information.

The terminal device 100 which generates and outputs an OTP based on the secure storage medium identification information is preferably configured to include all sorts of terminals having a secure storage medium and possessed by a customer.

That is, the terminal device 100 may be a device provided with a secure storage medium such as a USIM, a Secure Element, a TrustZone or the like and capable of contacting with the reader 210.

In addition, the terminal device 100 is a device capable of issuing an OTP application and can be implemented in the form of an electronic device such as a smart phone, a tablet, a PC, a notebook computer, a PDA or the like, and, other than these, it can be implemented in the form of various electronic devices capable of performing arithmetic operation and data transmission and reception operation.

Such a terminal device 100 will be described in detail with reference to FIG. 1.

A service provider device 200 is provided with a reader 210, and if the terminal device 200 is tagged on the reader 210 to issue an OTP application, the service provider device 200 acquires secure storage medium identification information of the terminal device 100 and transmits OTP application issuance request information including the acquired the secure storage medium identification information to the integrated service device 300. Here, the OTP application issuance request information includes secure storage medium identification information, terminal device identification information, user identification information and the like, and the secure storage medium identification information is used as information for confirming and authenticating a user when an OTP number is generated.

The service provider device 200 transmits the OTP application issuance request information to the integrated service device 300, and the integrated service device 300 may confirm at least one of validity of a user and validity of the terminal device 100 using the terminal device identification information and the user identification information included in the OTP application issuance request information.

Such a service provider device 200 is, for example, a teller terminal provided in a financial institute or the like and can be implemented in a single operation unit or in the form of an aggregated device combining two or more operation units with each other.

Although only one service provider device 200 is shown and described herein, the service provider device is a teller terminal provided in a financial institute or the like and may exist in plurality.

The service provider device 200 will be described in detail with reference to FIG. 3.

The integrated service device 300 registers secure storage medium identification information transmitted from the service provider device 200 as medium identification information for OTP authentication and transmits an OTP installation guide to the terminal device 100. The OTP installation guide is information on a guide for providing an OTP application and may be, for example, a URL, and if the terminal device 100 requests the OTP application through the information, the integrated service device 300 provides the OTP application to the terminal device 100 in response to the request.

In addition, an expiration date on the installation of the OTP application may be set in the OTP installation guide information, and when the OTP application is installed in the terminal device 100, the OTP application should be installed before the expiration date.

If download of the OTP application is requested by the terminal device 100 receiving the OTP installation guide, the integrated service device 300 provides the OTP application to the terminal device 100.

The integrated service device 300 confirms subscriber information by inquiring a database through the terminal device identification information, confirms the subscriber information by comparing the subscriber information with user's unique information or by inquiring a subscriber database through the received user's unique information, and confirms validity of the customer to verify whether or not the subscriber of the terminal device is identical to the customer applying for issuance of the OTP application by comparing the terminal device identification information included in the subscriber information and the received terminal device identification information.

In addition, the integrated service device 300 can read terminal information of a terminal device 100 corresponding to the terminal device identification information and confirm validity of the terminal device to verify whether or not the OTP service applied by the customer through the terminal device 100 can be used.

When the OTP service applied by the customer according to an embodiment of the present invention operates after a specific OTP application is installed in the customer terminal device 100, it is preferable for the integrated service device 300 to read terminal information (or device information) of the customer terminal device 100 and confirm validity of the customer terminal device to confirm whether or not an operation platform capable of installing and operating an OTP application is provided in the customer terminal device, as a result of the reading.

Such an integrated service device 300 may include a plurality of authentication servers or the like corresponding to a communication company, an OTP provider or the like.

Meanwhile, the integrated service device 300 can be implemented in a single operation unit or in the form of an aggregated device combining two or more operation units with each other. For example, the integrated service device 300 can be implemented in a single server or in a form connecting two or more servers.

The integrated service device 300 will be described in detail with reference to FIG. 4.

According to the present invention, the integrated service device 300 reads an identification number (an ICCID in the case of a USIM or an SE) of an OTP application secure storage medium utilizing the reader 210 installed in a branch of a financial company to perform face-to-face confirmation for issuance of an OTP application and registers the identification number to be matched with the subscriber information.

Even in this case, the integrated service device 300 may transmit an authentication number to the terminal device requested by the user and verify whether or not the transmitted authentication number matches an authentication number presented by the customer as a preliminary procedure for confirming whether or not the terminal device 100 belongs to the customer.

This method can solve the problem of face-to-face confirmation for confirming the real name of the user, which occurs when an OTP application is installed, and minimize a waiting time of the customer at a branch by tagging the terminal device 100 on the reader 210 while the customer sees the service provider face-to-face.

In addition, it is convenient in that the user receiving the OTP installation guide may install the OTP application at any time as needed according to the information on the OTP installation guide, and security also can be enhanced.

Figure 2:
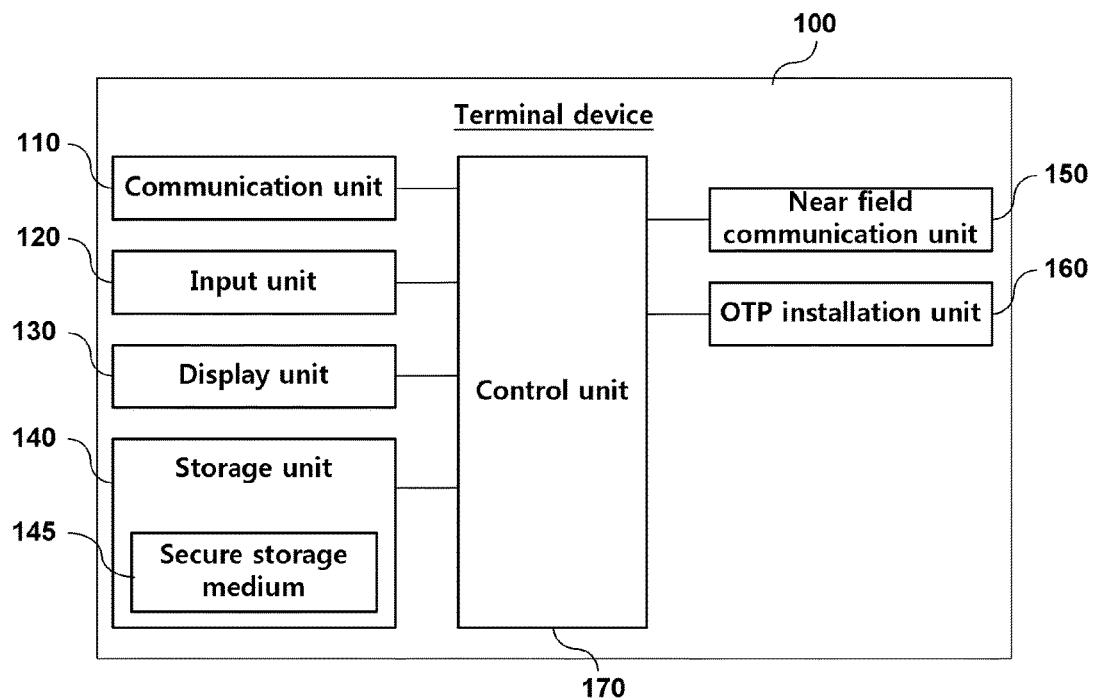
FIG. 2 is a block diagram schematically showing the configuration of a terminal device according to an embodiment of the present invention.

FIG. 2 is a block diagram schematically showing the configuration of a terminal device according to an embodiment of the present invention.

Referring to FIG. 2, the terminal device 100 includes a data communication unit 110 for transmitting and receiving data to and from various electronic devices, an input unit 120, a display unit 130, a storage unit 140, a near field communication unit 150, an OTP installation unit 160 and a control unit 170.

The data communication unit 110 is a configuration for transmitting and receiving data to and from various electronic devices. Specifically, the data communication unit 110 can be connected to the terminal device 100, the service provider device and the integrated service device through a wired or wireless communication network, and it is a configuration capable of transmitting and receiving various data including an OTP application issuance request, an OTP installation guide and the like based on such a connection.

Such a data communication unit 110 may include various wired or wireless communication modules and may transmit and receive data through various wireless or wired communication specifications. For example, the data communication unit 110 can be implemented in a form including a variety of standard communication modules of ITU, IEEE, ISO, IEC and the like and may be implemented in a form including a variety of communication modules other than the standard communication modules.

The input unit 120 is a configuration for receiving information from a user. Particularly, such an input unit 120 can be used to input whether or not to install an OTP application or the like.

Meanwhile, the input unit 120 can be implemented in an input device such as a keypad, a touch panel or the like and may be implemented in various input devices other than such an input device. In addition, the input unit 120 also can be implemented in the form of a touch screen integrated with the display unit 130.

The display unit 130 is a configuration for displaying various information related to operation of the terminal device 100 and may display various information such as an OTP installation guide, an authentication number and the like. Such a display unit 130 can be implemented through a variety of display devices including an LCD, an LED and the like.

The storage unit 140 is a configuration for storing data related to operation of the terminal device 100. For example, the storage unit 140 may store a variety of data including a data for implementing a UI, a data transferred through the data communication unit 110, a data input through the input unit 120 and the like. Such a storage unit 140 may be implemented in a form including various kinds of memory elements.

In addition, the storage unit 140 may include a secure storage medium 145 such as a USIM, a Secure Element, a TrustZone or the like, and an OTP application is stored in the secure storage medium 145.

The near field communication unit 150 may include a near field wireless communication module such as WiFi or the like and communicates with a reader, a bar code, a two-dimensional code, a QR code, an RFID or the like installed in a financial institute.

If an OTP installation guide is received through the data communication unit 110, the OTP installation unit 160 displays the OTP installation guide on the display unit 130. At this point, the OTP installation unit 160 may determine whether or not an OTP application is stored in the secure storage medium 145 and display the OTP installation guide or display a message inquiring whether or not to install the OTP application if the OTP application is not stored.

If the user selects consent to OTP installation through the input unit 120, the OTP installation unit 160 downloads the OTP application through the data communication unit 110 and stores the OTP application in the secure storage medium of the storage unit 140.

Meanwhile, the OTP installation unit 160 may be implemented by a processor or the like needed to execute a program on a computing device. Like this, the OTP installation unit 160 can be implemented by physically independent configurations or implemented in a form functionally separated in a processor.

The control unit 170 is a configuration for controlling operation of various configuration units of the terminal device 100 including the data communication unit 110, the input unit 120, the display unit 130, the storage unit 140, the near field communication unit 150 and the OTP installation unit 160.

Such a control unit 170 may include at least one operation unit, and, here, the operation unit may be a general-purpose central processing unit (CPU), a programmable device element (CPLD or FPGA) implemented to be appropriate to a specific purpose, an application specific integrated circuit (ASIC) or a microcontroller chip.

Figure 3:
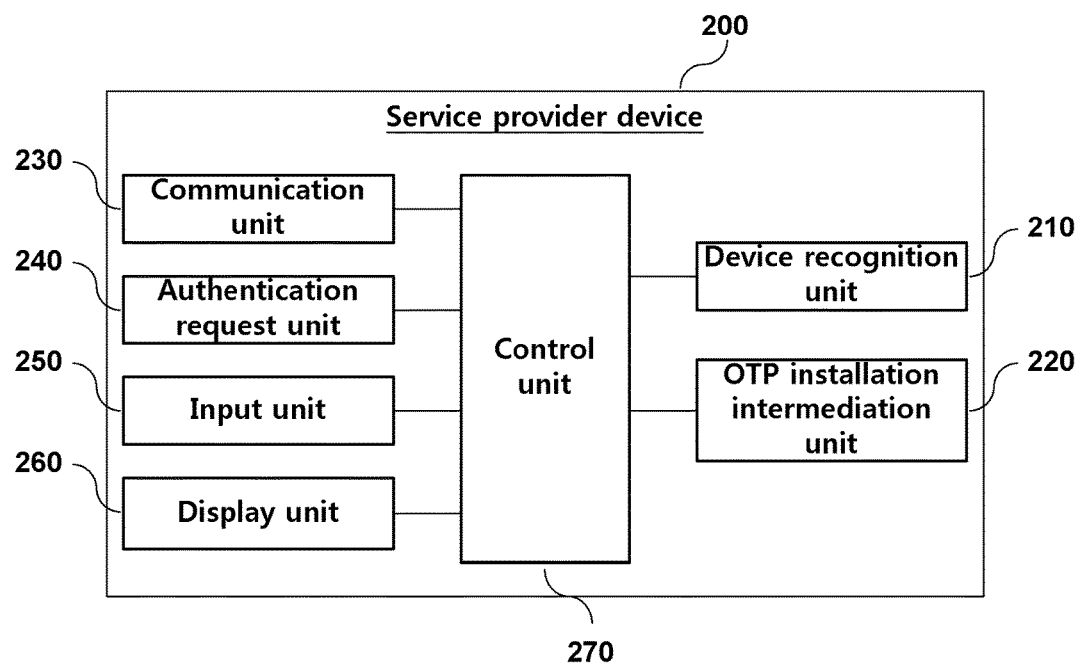
FIG. 3 is a block diagram schematically showing the configuration of a service provider device according to an embodiment of the present invention.

FIG. 3 is a block diagram schematically showing the configuration of a service provider device according to an embodiment of the present invention.

Referring to FIG. 3, the service provider device 200 includes a device recognition unit 210, an OTP installation intermediation unit 220, a communication unit 230, an authentication request unit 240, an input unit 250, a display unit 260 and a control unit 270.

The device recognition unit 210 recognizes a tagged terminal device through a near field communication. That is, the device recognition unit 210 may be, for example, a reader for recognizing secure storage medium identification information by tagging of the terminal device or a module for recognizing entrance of the terminal device into a previously set service area.

When the secure storage medium identification information is recognized through the device recognition unit 210, the OTP installation intermediation unit 220 transmits OTP application issuance request information including the secure storage medium identification information to the integrated service device. The secure storage medium identification information is registered as medium identification information for OTP authentication in the integrated service device.

In addition, when terminal device identification information is recognized through the device recognition unit 210, the OTP installation intermediation unit 220 requests the integrated service device to transmit an OTP installation guide.

When an OTP serial number is received through the communication unit 230 or input through the input unit 250, the OTP installation intermediation unit 220 requests the integrated service device to register the OTP serial number as medium identification information for OTP authentication.

The communication unit 230 is a configuration for transmitting and receiving data to and from various electronic devices. Particularly, the communication unit 230 can be connected to two or more devices and may transmit and receive various information such as information on an OTP application issuance request, an authentication number request, an OTP installation guide request, an OTP serial number registration request and the like.

The authentication request unit 240 requests an authentication number for the terminal device from the integrated service device and transmits an inputted authentication number to the integrated service device to request authentication of the authentication number. That is, if the OTP application issuance request information is inputted, the authentication request unit 240 performs confirmation of the real name of the customer, requests an authentication number from the integrated service device to confirm whether or not the terminal device identification information of the corresponding customer is normal, and receives the authentication number from the customer and verifies the authentication number.

The input unit 250 is a configuration for receiving information from a service provider. Particularly, such an input unit 250 can be used to input OTP application issuance request information, an authentication number or the like.

Meanwhile, the input unit 250 can be implemented in an input device such as a keypad, a touch panel or the like and may be implemented in various input devices other than such an input device. In addition, the input unit 250 also can be implemented in the form of a touch screen integrated with the display unit 260.

The display unit 260 is a configuration for displaying various information related to operation of the service provider device 200 and may display various information such as OTP application issuance request information, an authentication number and the like. Such a display unit 260 can be implemented through a variety of display devices including an LCD, an LED and the like.

Meanwhile, the device recognition unit 210, the OTP installation intermediation unit 220 and the authentication request unit 240 can be respectively implemented by a processor or the like needed to execute a program on a computing device. Like this, the device recognition unit 210, the OTP installation intermediation unit 220 and the authentication request unit 240 can be implemented by physically independent configurations or implemented in a form functionally separated in a processor.

The control unit 270 is a configuration for controlling operation of various configuration units of the service provider device 200 including the OTP installation intermediation unit 220, the communication unit 230, the authentication request unit 240, the input unit 250 and the display unit 260.

Such a control unit 270 may include at least one operation unit, and, here, the operation unit may be a general-purpose central processing unit (CPU), a programmable device element (CPLD or FPGA) implemented to be appropriate to a specific purpose, an application specific integrated circuit (ASIC) or a microcontroller chip.

Figure 4:
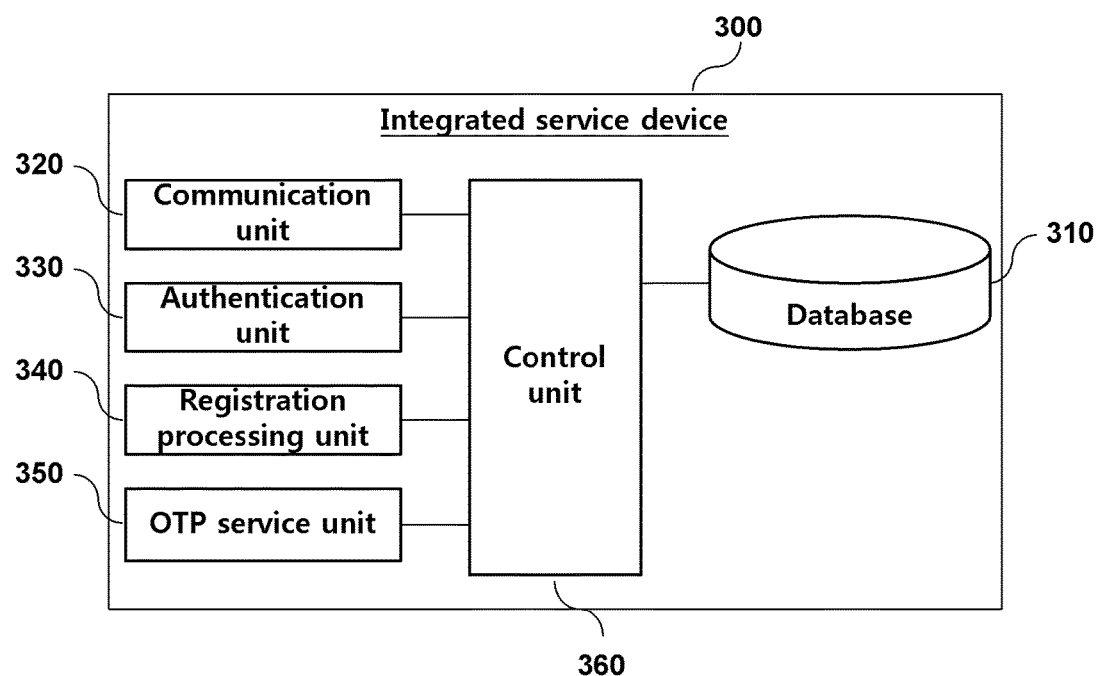
FIG. 4 is a block diagram schematically showing the configuration of an integrated service device according to an embodiment of the present invention.

FIG. 4 is a block diagram schematically showing the configuration of an integrated service device according to an embodiment of the present invention.

Referring to FIG. 4, the integrated service device 300 includes a database 310, a communication unit 320, a registration processing unit 340, an OTP service unit 350 and a control unit 360.

The database 310 stores subscriber information including user identification information of subscribers, terminal device identification information, whether or not an OTP application is installed, secure storage medium identification information, an OTP serial number, user's personal information and the like. Here, the user identification information may be an ID, a password and the like, and the user's personal information may include a name, an address and the like.

The communication unit 320 is a configuration for transmitting and receiving data to and from various electronic devices. Particularly, the communication unit 320 can be connected to two or more devices and may transmit and receive various information such as an authentication number, an OTP installation guide and the like.

If OTP application issuance request information including the secure storage medium identification information is received from the service provider device, the registration processing unit 340 registers the secure storage medium identification information as medium identification information for OTP authentication and transmits an OTP installation guide to a corresponding terminal device. At this point, the registration processing unit 340 registers the secure storage medium identification information in the database 310 to be matched with corresponding subscriber information.

In addition, if OTP application issuance request information including service area identification information and terminal device identification information is received from the service provider device, the registration processing unit 340 transmits an OTP installation guide to a corresponding terminal device, and if an OTP serial number is received from the service provider device, the registration processing unit 340 registers the OTP serial number as medium identification information for OTP authentication.

At this point, the registration processing unit 340 confirms whether or not an OTP application is issued to a user corresponding to the terminal device identification information included in the OTP application issuance request information by inquiring the database 310, and if the OTP application is not issued, it may transmit an OTP installation guide.

If download of the OTP application is requested by the terminal device, the OTP service unit 350 provides an OTP application.

The integrated service device 300 having such a configuration may further include an authentication unit 330 for verifying validity of the terminal device identification information of a customer.

If an authentication number request signal is received from the service provider device, the authentication unit 330 generates and transmits an authentication number to a corresponding terminal device.

If an authentication request signal including the authentication number is received from the service provider device, the authentication unit 330 compares the authentication number with a previously stored authentication number and transmits a result of authentication to the service provider device.

Meanwhile, the authentication unit 330, the registration processing unit 340 and the OTP service unit 350 can be respectively implemented by a processor or the like needed to execute a program on a computing device. Like this, the authentication unit 330, the registration processing unit 340 and the OTP service unit 350 can be implemented by physically independent configurations or implemented in a form functionally separated in a processor.

The control unit 360 is a configuration for controlling operation of various configuration units of the integrated service device 300 including the database 310, the communication unit 320, the authentication unit 330, the registration processing unit 340 and the OTP service unit 350.

Such a control unit 360 may include at least one operation unit, and, here, the operation unit may be a general-purpose central processing unit (CPU), a programmable device element (CPLD or FPGA) implemented to be appropriate to a specific purpose, an application specific integrated circuit (ASIC) or a microcontroller chip.

Figure 5:
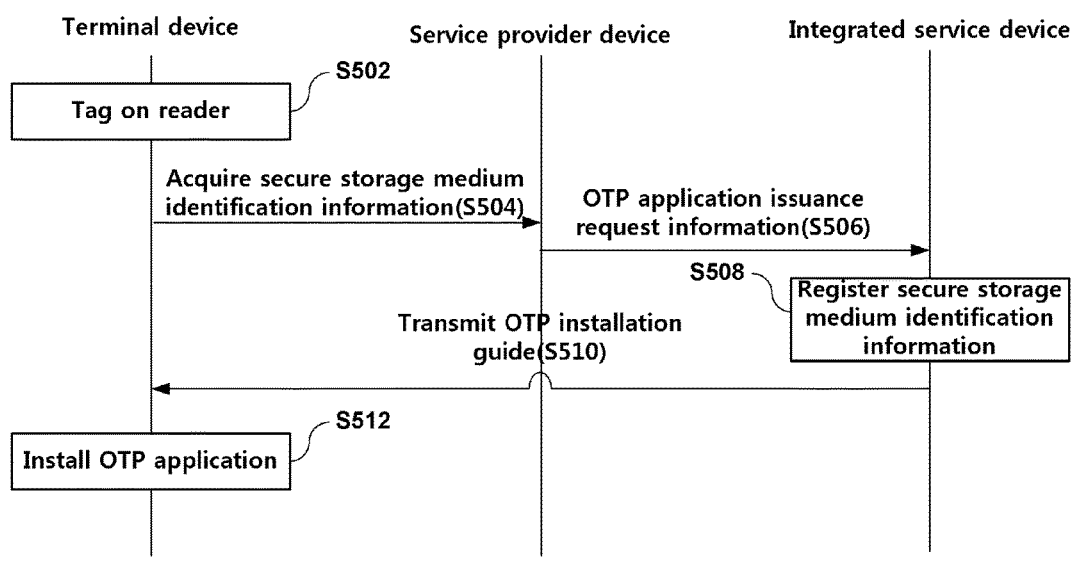
FIG. 5 is a sequence diagram showing a method of issuing an OTP application in a face-to-face confirmation manner according to an embodiment of the present invention.

FIG. 5 is a sequence diagram showing a method of issuing an OTP application in a face-to-face confirmation manner according to an embodiment of the present invention.

Referring to FIG. 5, if a user of the terminal device tags the terminal device on a reader provided in a financial institute such as a bank or the like to issue an OTP application (step S502), the service provider device acquires secure storage medium identification information of the terminal device (step S504). At this point, the user tags the terminal device on the reader while seeing a service provider face-to-face.

The service provider device transmits OTP issuance request information including the acquired secure storage medium identification information to the service provider device (step S506). The OTP issuance request information may include secure storage medium identification information, terminal device identification information, user identification information and the like.

The integrated service device registers the secure storage medium identification information as medium identification information for OTP authentication (step S508) and transmits an OTP installation guide to a terminal device corresponding to the terminal device identification information (step S510).

The terminal device displays the OTP installation guide and installs an OTP application according to selection of the user (step S512). That is, if the terminal device selects consent to installation of the OTP application in the OTP installation guide, the terminal device downloads the OTP application from the integrated service device and installs the OTP application.

Since the procedure of invoking the OTP application and using an OTP when a financial transaction is performed is the same as that of the prior art, description thereof will be omitted.

Figure 6:
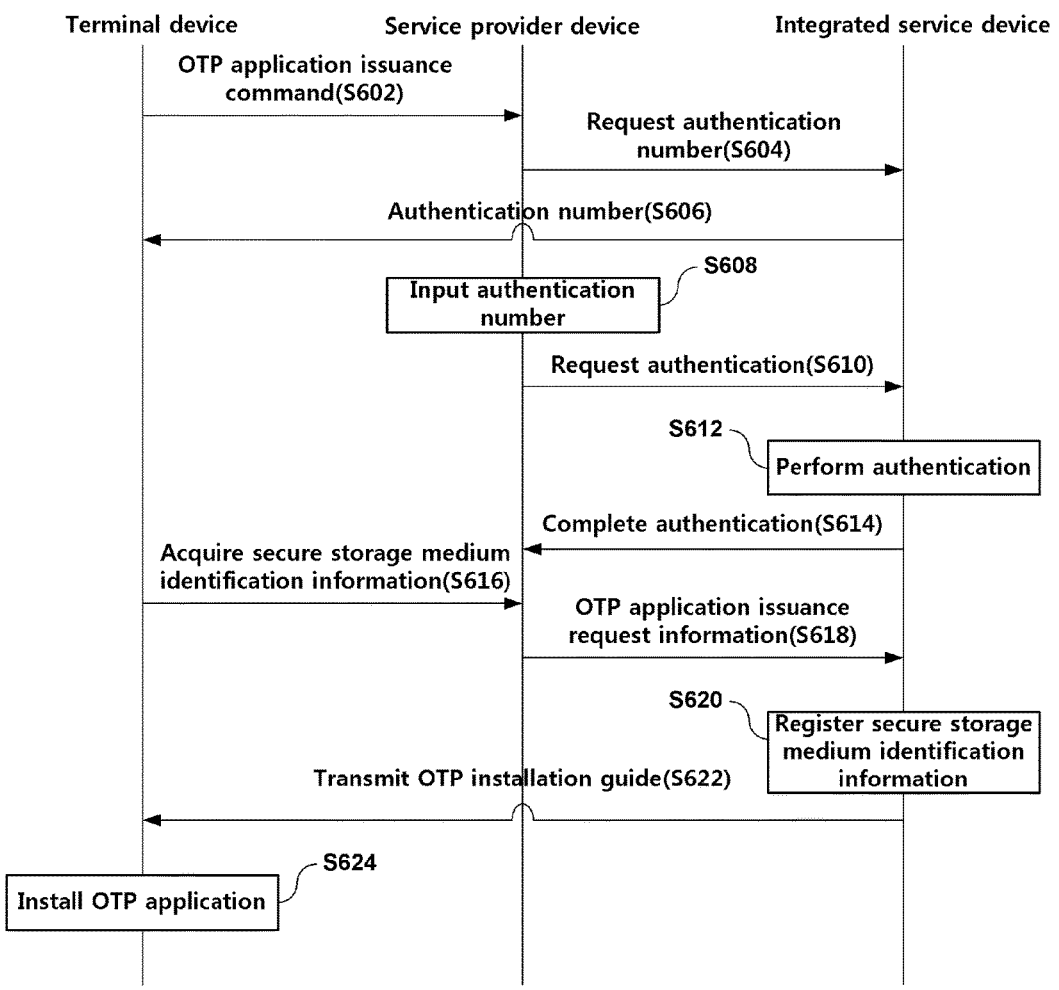
FIG. 6 is a sequence diagram showing a method of issuing an OTP application in a face-to-face confirmation manner according to another embodiment of the present invention.

FIG. 6 is a sequence diagram showing a method of issuing an OTP application in a face-to-face confirmation manner according to another embodiment of the present invention.

Referring to FIG. 6, if a user of the terminal device connects to a service provider through a communication network and selects the OTP application issuance command, the terminal device transmits the OTP application issuance command to the service provider device (step S602). Here, although it is described that the user of the terminal device selects the OTP application issuance command and the terminal device transmits the OTP application issuance command to the service provider device, the service provider may directly input the OTP application issuance command by the request of the user of the terminal device.

The service provider device transmits an authentication number request signal including terminal device identification information to the integrated service device in order to authenticate validity of the terminal device (step S604).

The integrated service device generates and transmits an authentication number to a terminal device corresponding to the terminal device identification information (step S606). The terminal device displays the authentication number, and the user presents the authentication number to the service provider or transmits the authentication number to the service provider device through a communication network.

If the authentication number is input (step S608), the service provider device transmits an authentication request signal including the authentication number to the integrated service device (step S610). At this point, the authentication number may be a number directly input by the service provider or a number transmitted from the terminal device through a communication network, and the authentication request signal may include the authentication number, terminal device identification information, service provider device identification information and the like.

The integrated service device performs authentication by comparing the authentication number included in the authentication request signal with a previously stored authentication number (step S612) and transmits a result of authentication to the service provider device (step S614).

That is, if the authentication number included in the authentication request signal is the same as the previously stored authentication number, the integrated service device transmits an authentication success message to the service provider device, and if the authentication number included in the authentication request signal is not the same as the previously stored authentication number, the integrated service device transmits an authentication failure message to the service provider device.

If the authentication success message is received, the service provider requests the user to tag the terminal device on the reader, and the user tags the terminal device on the reader.

Since the steps thereafter are the same as those described in FIG. 5, description thereof will be omitted.

According to the present invention, the integrated service device confirms the real name of a customer first and performs a procedure of transmitting an authentication number to confirm whether or not the terminal device number of a corresponding customer is normal, receiving a corresponding authentication number from the customer, and verifying the authentication number.

Then, the integrated service device reads identification information of the secure storage medium mounted on the customer terminal device using a reader installed in a branch and registers the identification information in the integrated service device.

Then, the integrated service device transmits an OTP installation guide to the terminal device of the corresponding customer, and the customer performs a procedure of installing an OTP application. When a financial transaction is performed after the OTP application is installed, the procedure of using an OTP is the same as that of the prior art.

Figure 7:
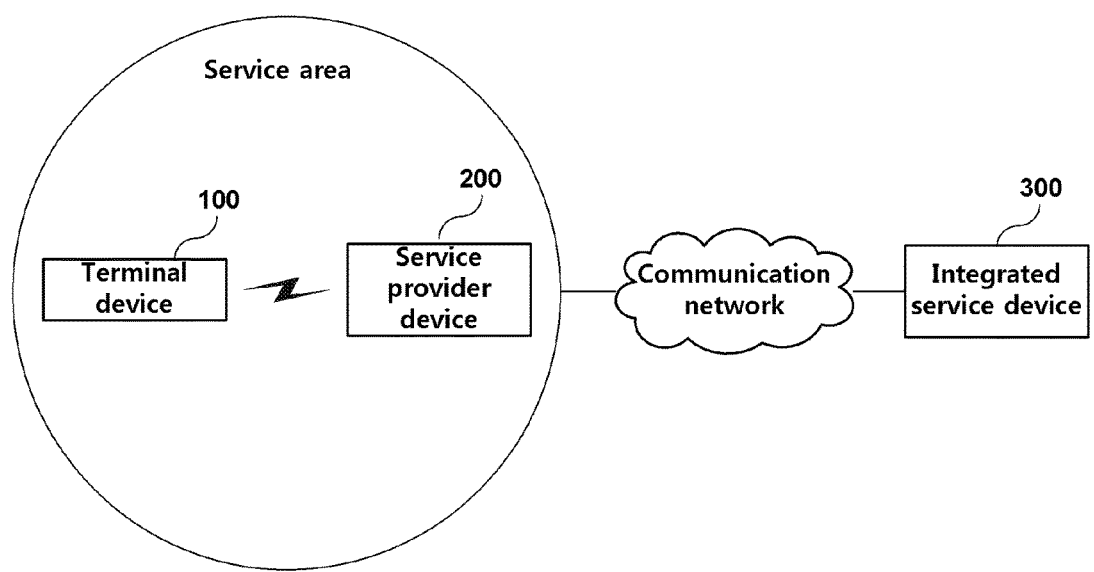
FIG. 7 is a view showing a system for issuing an OTP application in a face-to-face confirmation manner according to an embodiment of the present invention.

FIG. 7 is a view showing a system for issuing an OTP application in a face-to-face confirmation manner according to an embodiment of the present invention.

Referring to FIG. 7, a system for issuing an OTP application in a face-to-face confirmation manner includes a terminal device 100, a service provider device 200 and an integrated service device 300, and these may transmit and receive data through a communication network. In addition, a service area is set in a financial institute such as a bank or the like in which the service provider device 200 is installed, and the service area may be an area in which issuance of an OTP application is requested.

When the terminal device 100 enters a previously set service area, it automatically transmits OTP application issuance request information including terminal device identification information to the service provider device 200. Here, the service area is a place in which an OTP application can be issued, such as a bank, a securities company or the like, and unique identification information is assigned to each service area. The service area identification information may be identification information corresponding to a bar code, a two-dimensional code, a QR code, an RFID tag or the like installed to identify the location of a service area or identification information previously set according to the location information of each service area.

When an OTP installation guide is received from the integrated service device 300, the terminal device 100 determines whether or not the OTP application exists, displays a message inquiring whether or not to install the OTP application if the OTP application does not exist, and installs the OTP application according to selection of the user.

If the OTP application is installed, the terminal device 100 invokes the OTP application and displays an OTP serial number.

Since the terminal device 100 may use the installed OTP application only after registering the OTP serial number in the integrated service device 300, the user should present the OTP serial number while seeing a service provider face-to-face.

After the OTP application is installed in the terminal device 100, if the user orders generation of an OTP by handling the terminal device 100, a processor embedded in the terminal device 100 operates to execute the OTP application stored in the secure storage medium and generates an OTP using an OTP secret key and current time information.

Meanwhile, the terminal device 100 is a device provided with a secure storage medium such as a USIM, a Secure Element, a TrustZone or the like and capable of issuing an OTP application, which can be implemented in the form of an electronic device such as a smart phone, a tablet, a PC, a notebook computer, a PDA or the like, and, other than these, it can be implemented in the form of various electronic devices capable of performing arithmetic operation and data transmission and reception operation.

Since such a terminal device 100 is the same as the terminal device 100 shown in FIG. 2, it will be described in detail with reference to FIG. 2.

If the terminal device identification information is recognized as the terminal device 100 enters the service area or the terminal device identification information is input from a service provider, the service provider device 200 transmits OTP application issuance request information including the terminal device identification information, service area identification information and the like to the integrated service device 300.

The service provider device 200 transmits the previously input OTP application issuance request information to the integrated service device 300, and the integrated service device 300 confirms at least one of validity of a user and validity of the terminal device 100 using the terminal device identification information and the user identification information included in the OTP application issuance request information.

The service provider device 200 requests the integrated service device 300 to register the OTP serial number input from the service provider as medium identification information for OTP authentication.

Such a service provider device 200 is a teller terminal provided in a financial institute or the like, and the service provider device 200 will be described in detail with reference to FIG. 3.

If the OTP application issuance request information is received from the service provider device 200, the integrated service device 300 transmits an OTP installation guide to a terminal device 100 corresponding to the terminal device identification information. At this point, the integrated service device 300 may confirm whether or not the OTP application is issued to a user corresponding to the terminal device identification information, the user identification information or the like included in the OTP application issuance request information and transmit an OTP installation guide if the OTP application is not issued.

In addition, although the OTP application is installed in a terminal device corresponding to the terminal device identification information, the integrated service device 300 may transmit the OTP installation guide for update when update or the like is needed.

If download of the OTP application is requested by the terminal device 100 receiving the OTP installation guide, the integrated service device 300 provides the OTP application to the terminal device 100.

If an OTP serial number registration request signal is received from the service provider device 200, the integrated service device 300 registers the OTP serial number as medium identification information for OTP authentication.

If the OTP serial number is registered, the integrated service device 300 transmits a registration completion message to the terminal device 100. Then, the terminal device 100 may use the installed OTP application.

The integrated service device 300 confirms subscriber information by inquiring the database through the terminal device identification information, confirms the subscriber information by comparing the subscriber information and user's unique information or inquiring the database through the received user's unique information, and confirms validity of the customer to verify whether or not the subscriber of the terminal device is identical to the customer applying for issuance of the OTP application by comparing the terminal device identification information included in the subscriber information and the received terminal device identification information.

In addition, the integrated service device 300 can read terminal information of a terminal device 100 corresponding to the terminal device identification information and confirm validity of the terminal device to verify whether or not the OTP service applied by the customer through the terminal device 100 can be used.

Since such an integrated service device 300 is the same as the integrated service device shown in FIG. 4, it will be described in detail with reference to FIG. 4.

When the OTP service applied by the customer according to an embodiment of the present invention operates after a specific OTP application is installed in the customer terminal device 100, it is preferable for the integrated service device 300 to read terminal information (or device information) of the customer terminal device 100 and confirm validity of the customer terminal device to confirm whether or not an operation platform capable of installing and operating an OTP application is provided in the customer terminal device, as a result of the reading.

According to the present invention, an OTP installation guide is transmitted to the terminal device 100 of a customer visiting a branch of a financial company to perform face-to-face confirmation for issuance of an OTP application so that the terminal device 100 may install the OTP application, and an OTP serial number of the corresponding OTP application is confirmed by the terminal device 100, and the OTP serial number is registered through the branch.

Even in this case, the integrated service device 300 may transmit an authentication number to the terminal device requested by the user and verify whether or not the transmitted authentication number matches an authentication number presented by the customer as a preliminary procedure for confirming whether or not the terminal device 100 belongs to the customer. Since the customer may have installed the OTP application in advance, in this method, it is preferable to necessarily apply the verification in the face-to-face confirmation procedure.

Since this method may automatically apply for issuance of an OTP application when a customer enters a service area in a bank or the like and the customer only needs to present an OTP serial number to a service provider to issue the OTP application, the face-to-face confirmation problem occurring when the OTP application is installed can be solved, and, in addition, a waiting time of the customer at a branch can be minimized.

In addition, it is convenient in that the serial number can be confirmed through the terminal device 100 and registered at a branch regardless of a type of the secure storage medium of the terminal device 100, and it is advantageous in that the present invention can be used although a reader is not installed in a branch of a financial company.

Although the face-to-face confirmation problem is solved by automatically applying for issuance of an OTP application and presenting an OTP serial number to the service provider, the face-to-face confirmation problem also can be solved by directly inputting the terminal device identification information by the service provider and applying for issuance of the OTP application.

In this case, the terminal device 100 transmits the OTP serial number displayed by invoking the OTP application to the service provider device 200 through a communication network, and the service provider device 200 may register the OTP serial number in the integrated service device 300 to be matched with corresponding subscriber information.

FIG. 8 is a sequence diagram showing a method of issuing an OTP application in a face-to-face confirmation manner according to another embodiment of the present invention.

Referring to FIG. 8, if the terminal device identification information is recognized as the terminal device enters a service area or the terminal device identification information is input from a service provider, the service provider device transmits OTP application issuance request information including the terminal device identification information to the integrated service device (step S802).

The integrated service device transmits an OTP installation guide to a terminal device 100 corresponding to the terminal device identification information (step S804). At this point, the integrated service device confirms whether or not an OTP application is issued to a user corresponding to the terminal device identification information included in the OTP application issuance request information, and if the OTP application is not issued, it may transmit an OTP installation guide.

The terminal device displays the OTP installation guide and installs an OTP application according to selection of the user (step S806). At this point, if the OTP installation guide is received from the integrated service device, the terminal device determines whether or not the OTP application exists, displays the OTP installation guide if the OTP application does not exist, and may not display the OTP installation guide if the OTP application exists.

When the OTP installation guide is displayed, if the user selects consent to installation of the OTP application in the OTP installation guide, the terminal device downloads the OTP application from the integrated service device and installs the OTP application.

If the OTP application is installed, the terminal device invokes the OTP application (step S808) and displays an OTP serial number (step S810).

If the user presents the OTP serial number while seeing a service provider face-to-face, the service provider inputs the OTP serial number (step S812), and the service provider device transmits an OTP serial number registration request signal including the OTP serial number to the integrated service device (step S814). Here, the OTP serial number registration request signal may include an OTP serial number, terminal device identification information, service provider device identification information and the like.

The integrated service device registers the OTP serial number as medium identification information for OTP authentication (step S816). If the OTP serial number is registered, the user of the terminal device may use the OTP application installed in the terminal device.

FIG. 9 is a sequence diagram showing a method of issuing an OTP application in a face-to-face confirmation manner according to another embodiment of the present invention.

Referring to FIG. 9, if a user of the terminal device connects to a service provider and selects the OTP application issuance command, the terminal device transmits the OTP application issuance command to the service provider device (step S902). Here, although it is described that the user of the terminal device selects the OTP application issuance command and the terminal device transmits the OTP application issuance command to the service provider device, the service provider may directly input the OTP application issuance command by the request of the user of the terminal device.

The service provider device transmits an authentication number request signal including terminal device identification information to the integrated service device in order to authenticate validity of the terminal device (step S904).

The integrated service device generates and transmits an authentication number to a terminal device corresponding to the terminal device identification information (step S906). The terminal device displays the authentication number, and the user presents the authentication number to the service provider or transmits the authentication number to the service provider device through a communication network.

If the authentication number is input (step S908), the service provider device transmits an authentication request signal including the authentication number to the integrated service device (step S910). At this point, the authentication number may be a number directly input by the service provider or a number transmitted from the terminal device through a communication network, and the authentication request signal may include the authentication number, terminal device identification information, service provider device identification information and the like.

The integrated service device performs authentication by comparing the authentication number included in the authentication request signal with a previously stored authentication number (step S912) and transmits a result of authentication to the service provider device (step S914). That is, if the authentication number included in the authentication request signal is the same as the previously stored authentication number, the integrated service device transmits an authentication success message to the service provider device, and if the authentication number included in the authentication request signal is not the same as the previously stored authentication number, the integrated service device transmits an authentication failure message to the service provider device.

If the authentication success message is received, the service provider device transmits OTP application issuance request information including the terminal device identification information to the integrated service device (step S916).

Since the steps thereafter are the same as those described in FIG. 8, description thereof will be omitted.

According to the present invention, the integrated service device confirms the real name of a customer first and performs a procedure of transmitting an authentication number to confirm whether or not the terminal device number of a corresponding customer is normal, receiving a corresponding authentication number from the customer, and verifying the authentication number.

Then, the integrated service device transmits an OTP installation guide to the terminal device of the customer, and the customer installs an OTP application according to the OTP installation guide. A customer who already has installed the OTP application may omit this process.

Then, the terminal device invokes the installed OTP application and confirms the serial number of a corresponding OTP and then performs a process of registering the serial number through the branch. The procedure of using the OTP application when a financial transaction is performed thereafter is the same as the method of the prior art.

Such a method of issuing an OTP application in a face-to-face confirmation manner can be created as a program, and codes and code segments configuring the program can be easily inferred by programmers in the art. In addition, the program related to the method of issuing an OTP application in a face-to-face confirmation manner may be stored in an information storage medium which can be read by an electronic device (readable media) and may be read and executed by the electronic device.

It will be appreciated by those of ordinary skill in the art that the present invention may be embodied in other specific forms without departing from the spirit and essential characteristics of the present invention. Therefore, the embodiments described above are to be understood as merely illustrative and not restrictive limiting the scope of the present invention. In addition, the flowcharts shown in the figures are merely sequential orders shown for illustrative purposes to achieve the most desirable result in embodying the present invention, and it is apparent that other additional steps may be provided, or some steps may be deleted.

Embodiments of the subject matter and the functional operations described in this specification can be implemented in digital electronic circuitry, or in computer software, firmware, or hardware including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by or to control the operation of a data processing apparatus.

The tangible program carrier can be a computer readable medium, which can be a machine-readable storage device, a machine-readable storage substrate, a memory device, a composition of matter effecting a machine-readable propagated signal, or any combination thereof.

Meanwhile, the term "apparatus" or "system" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or any combination thereof.

A computer program (also referred to as a program, software, software application, script, or code) can be written in any form of programming language, including compiled or interpreted languages, or declarative or procedural languages, and can be deployed in any form, including as a stand-alone program or as a module, component, subroutine, or other unit suitable for use in a computing environment.

A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

A computer program can be deployed to be executed on one computer or on multiple computers that are located at one site or distributed across multiple sites and interconnected by a wired/wireless communication network.

Computer-readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Further, the processor and memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network.

Hereinafter, further specific embodiments capable of implementing the system described in this specification together with the contents described above and an MO service-based benefit providing method will be described in detail.

The system described in this specification and the method of issuing an OTP application in a face-to-face confirmation manner may be partially or entirely used through a means executing computer software, program codes or instructions on a server related to a client device or a web-based storage system or one or more processors included in the server. Here, the processor may be part of a computing platform such as a server, a client, a network infrastructure, a mobile computing platform, a fixed computing platform or the like, and, specifically, the processor may be any type of computer or processing device capable of executing program instructions, codes and the like. In addition, the processor may further include memory for storing methods, instructions, codes and programs for issuing an OTP application in a face-to-face confirmation manner, and if the processor does not include the memory, the processor can access, through a separate interface, a storage device such as CD-ROM, DVD, memory, hard disk, flash drive, RAM, ROM, cache or the like which stores the methods, instructions, codes and programs for issuing an OTP application in a face-to-face confirmation manner.

In addition, the system described in this specification and the method of issuing an OTP application in a face-to-face confirmation manner may be partially or entirely used through an apparatus which executes computer software on a server, a client, a gateway, a hub, a router or network hardware. Here, the software may be executed on various kinds of servers such as a file server, a print server, a domain server, an Internet server, an Intranet server, a host server, a distributed server and the like, and the servers may include a memory, a processor, a computer readable storage medium, a storage medium, a communication device, a port, a client and an interface capable of accessing the other servers through a wired or wireless network.

In addition, the methods, instructions and codes for issuing an OTP application in a face-to-face confirmation manner also can be executed by a server, and other devices needed to execute the method of issuing an OTP application in a face-to-face confirmation manner may be implemented as part of a hierarchical structure associated with a server.

In addition, the server may provide an interface to other devices including, but not limited to, clients, other servers, printers, database servers, print servers, file servers, communication servers, distributed servers and the like, and a connection through the interface may facilitate remote execution of a program through a wired or wireless network.

In addition, any one of the devices connected to the server through an interface may include at least one storage device capable of storing the methods, instructions, codes and the like for issuing an OTP application in a face-to-face confirmation manner, and a central processor of the server may provide instructions, codes or the like to be executed on different devices to the devices so as to be stored in the storage device.

On the other hand, the system described in this specification and the method of issuing an OTP application in a face-to-face confirmation manner may be partially or entirely used through a network infrastructure. Here, the network infrastructure may include devices such as a computing device, a server, a router, a hub, a firewall, a client, a personal computer, a communication device, a routing device and the like and separate modules capable of executing a function of its own, and in addition to the devices and modules mentioned above, the network infrastructure may further include a storage medium such as a flash memory, a buffer, a stack, RAM, ROM or the like. In addition, the methods, instructions and codes for issuing an OTP application in a face-to-face confirmation manner may also be executed and stored by any one of the devices, modules and storage media included in the network infrastructure, and other devices needed to execute the method of issuing an OTP application in a face-to-face confirmation manner may also be implemented as part of the network infrastructure.

The system described in this specification and the method of issuing an OTP application in a face-to-face confirmation manner may be implemented in hardware or a combination of hardware and software appropriate to a specific application. Here, the hardware may include general purpose computer devices such as a personal computer, a mobile communication terminal and the like and enterprise specific devices, and the computer device may be implemented as a device including a memory, a microprocessor, a microcontroller, a digital signal processor, an application specific integrated circuits, a programmable gate array, a programmable array logic or the like or a combination of these.

The computer software, instructions, codes and the like described above may be stored or accessed by a readable device, and, here, the readable device may include memory such as a computer component provided with digital data used for computing for a predetermined time period, a semiconductor storage such as RAM or ROM, a permanent storage such as an optical disk, a mass storage such as a hard disk, a tape, a drum or the like, an optical storage such as a CD or a DVD, a flash memory, a floppy disk, a magnetic tape, a paper tape, a stand-alone RAM disk, a mass storage which can be mounted on a computer, a dynamic memory, a static memory, a variable storage, a network connection type storage such as a cloud and the like. Meanwhile, here, although the instructions, codes and the like includes all of languages such as a data-oriented language such as SQL, dBase or the like, a system language such as C, Objective C, C++, assembly or the like, an architecture language such as Java, NET or the like and an application language such as PHP, Ruby, Perl, Python or the like, it is not limited thereto and may include all the languages widely known to those skilled in the art.

In addition, the term "computer-readable medium" described in this specification refers to any medium that participates in providing instructions to a processor to execute a program. Specifically, although the medium includes a non-volatile medium such as a data storage device, an optical disk, a magnetic disk or the like, a volatile medium such as a dynamic memory or the like, and a transmission medium for transmitting data, such as a coaxial cable, a copper wire, an optical fiber or the like, it is not limited thereto.

Meanwhile, all the elements executing technical features of the present invention included in the block diagrams and flowcharts shown in the accompanying drawings of the present invention mean logical boundaries between the elements.

However, according to an embodiment of software or hardware, elements and features shown in the figures are implemented in the form of an independent software module, a monolithic software structure, a code, a service or a combination of these, and since the functions of the elements and features can be implemented by storing them in a medium which can be executed in a computer provided with a processor capable of executing stored program codes, instructions and the like, all the embodiments can also be regarded as within the scope of the present invention.

Accordingly, although the accompanying drawings and descriptions thereof explain technical features of the present invention, the technical features should not be simply deduced while a specific array of software for implementing the technical features is not mentioned clearly. That is, various embodiments described above may exist, and since part of such embodiments can be modified while possessing technical features the same as those of the present invention, this can also be regarded as within the scope of the present invention.

In addition, while operations are depicted in a particular order in the flowcharts of the drawings, this should not be understood as requiring that such operations be performed in the particular order shown or in sequential order, or that all illustrated operations be performed, to achieve desirable results. In certain circumstances, multi-tasking and parallel processing can be advantageous. Moreover, the separation of various system components in the embodiments described above should not be understood as requiring such separation in all embodiments and it should be understood that the described program components and systems can generally be integrated together in a single software product or packaged into multiple software products.

As described above, this specification is not intended to limit the present invention to the presented specific terms. While the present invention has been described in detail with reference to the particular illustrative embodiments, those skilled in the art can alter, change or modify the embodiments without departing from the scope and spirit of the present invention.

The scope of the present invention is defined by the accompanying claims, rather than the above detailed description, and the meaning and scope of the claims and all changes and modifications derived from equivalents thereof should be interpreted as being included in the scope of the present invention.

Since the present invention provides a system and method for issuing an OTP application in a face-to-face confirmation manner, the problem of face-to-face confirmation for confirming a real name of a user, which occurs when the OTP application is installed in a secure area of a terminal device (e.g., a USIM, an SE, a TrustZone or the like), can be solved.

What is claimed is:

1. A system for issuing an one time password (OTP) application in a face-to-face confirmation manner, the system comprising:
   at least one or more service provider devices configured to transmit OTP application issuance request information to an integrated service device, wherein the OTP application issuance request information includes recognition information on recognition of a terminal device tagged on a reader provided for each service provider or entering a previously set service area; and
   the integrated service device configured to:
      register secure storage medium identification information as medium identification information for OTP authentication; and
      transmit an OTP installation guide to the terminal device when the recognition information is the secure storage medium identification information; and
      transmit the OTP installation guide to the terminal device when the recognition information is terminal device identification information;
   wherein the terminal device receiving the OTP installation guide is configured to determine whether the OTP application exists, and when the OTP application is determined not to exist, displays an OTP application installation guide and installs the OTP application according to selection of a user; and
   wherein the service provider device is further configured to:
      transmit an OTP serial number received from the service provider to the integrated service device;
   wherein the service provider device includes an authentication request unit configured to, when the OTP application issuance request information is inputted, perform confirmation of a real name of a customer, request an authentication number from the integrated service device to confirm the terminal device identification information of the corresponding customer is normal, and receive the authentication number from the customer and verify the authentication number; and
   wherein the integrated service device is further configured to receive and register the OTP serial number as medium identification information for OTP authentication.

2. The system according to claim 1, wherein the service provider device transmits an OTP serial number received from the service provider to the integrated service device, and the integrated service device receives and registers the OTP serial number as medium identification information for OTP authentication.

3. A service provider device comprising:
   a communication unit configured to transmit and receive data to and from an integrated service device;
   a device recognition unit provided for each service provider to recognize a terminal device; and
   an one time password (OTP) installation intermediation unit configured to:
      transmit OTP application issuance request information to an integrated service device when a secure storage medium identification information is recognized to be included in the OTP application issuance request information through the device recognition unit; and
      request transmission of an OTP installation guide to the terminal device when terminal device identification information is recognized through the device recognition unit, wherein when an OTP serial number is received or inputted from the terminal device or the service provider, the OTP installation intermediation unit registers the OTP serial number as medium identification information for OTP authentication;
   an authentication request unit configured to, when the OTP application issuance request information is inputted, perform confirmation of a real name of a customer, request an authentication number from the integrated service device to confirm the terminal device identification information of the corresponding customer is normal, and receive the authentication number from the customer and verify the authentication number; and
   wherein the communication unit is further configured to transmit an OTP serial number received from the service provider to the integrated service device, and the integrated service device is further configured to receive and register the OTP serial number as medium identification information for OTP authentication.

4. The service provider device according to claim 3, wherein the authentication request unit is configured to request an authentication number for the terminal device from the integrated service device and transmit, when the authentication number is input, the input authentication number to the integrated service device to perform authentication.

5. The service provider device according to claim 3, wherein the device recognition unit is a reader for recognizing secure medium identification information by tagging of the terminal device or a module for receiving identification information of a terminal device entering a previously set service area from the service provider.

6. The service provider device according to claim 3, wherein the communication unit is connected to two or more devices, and configured to transmit and receive information on the OTP application issuance request, an authentication number request, an OTP installation guide request and OTP serial number registration request.

7. The service provider device according to claim 3, further comprising an input unit configured to receive information from a service provider, the input unit is used to input the OTP application issuance request information and an authentication number.

8. The service provider device according to claim 3, further comprising an display unit configured to display the OTP application issuance request information and an authentication number on a screen.

9. The service provider device according to claim 3, further comprising an control unit configured to control operation of the OTP installation intermediation unit, the communication unit, the authentication request unit, an input unit and a display unit.

10. An integrated service device comprising:
    a communication unit configured to transmit and receive data to and from a terminal device or a service provider device; and
    a registration processing unit configured to:
       register, when one time password (OTP) application issuance request information including secure storage medium identification information of the terminal device is received from the service provider device, the secure storage medium identification information as medium identification information for OTP authentication; and transmit an OTP installation guide to the terminal device, wherein the registration processing unit confirms whether or not an OTP of a corresponding terminal device has been issued when OTP application issuance request information including terminal device identification information or service area identification information is received from the service provider device;

wherein the communication unit is further configured to receive an OTP serial number from the service provider, and register the OTP serial number as medium identification information for OTP authentication; and wherein the service provider device includes an authentication request unit configured to, when the OTP application issuance request information is inputted, perform confirmation of a real name of a customer, request an authentication number from the integrated service device to confirm the terminal device identification information of the corresponding customer is normal, and receive the authentication number from the customer and verify the authentication number.

11. The integrated service device according to claim 10, wherein the registration processing unit transmits an OTP installation guide to the terminal device when the OTP has not been issued, and registers an OTP serial number as medium identification information for OTP authentication when the OTP serial number is received from the service provider device.

12. The integrated service device according to claim 10, further comprising an authentication unit for generating and transmitting an authentication number to the terminal device when an authentication number request signal is received from the service provider device and, when an authentication request signal including the authentication number is received from the service provider device, comparing the authentication number with a previously stored authentication number and transmitting a result of authentication to the service provider device.

13. The integrated service device according to claim 10, further comprising an OTP service unit configured to provide an OTP application when download of the OTP application is requested by the terminal device.

14. The integrated service device according to claim 10, further comprising a database configured to store subscriber information including user identification information of subscribers, terminal device identification information, whether or not an OTP application is installed, secure storage medium identification information, an OTP serial number, user's personal information.

15. The integrated service device according to claim 14, wherein the registration processing unit registers the secure storage medium identification information in the database to be matched with corresponding subscriber information.

16. The integrated service device according to claim 14, further comprising a control unit configured to control operation of the integrated service device including the database, the communication unit, an authentication unit, the registration processing unit and an OTP service unit.

17. The integrated service device according to claim 12, the authentication unit verifies validity of the terminal device identification information of a customer.

18. The system according to claim 1, wherein the integrated service device is configured to register the OTP serial number to be matched with identification information of the terminal device.

* * * * *